March 31, 1942. H. W. SEMAR 2,278,152
MARINE TURBINE CROSS-OVER CONNECTION
Filed May 13, 1941
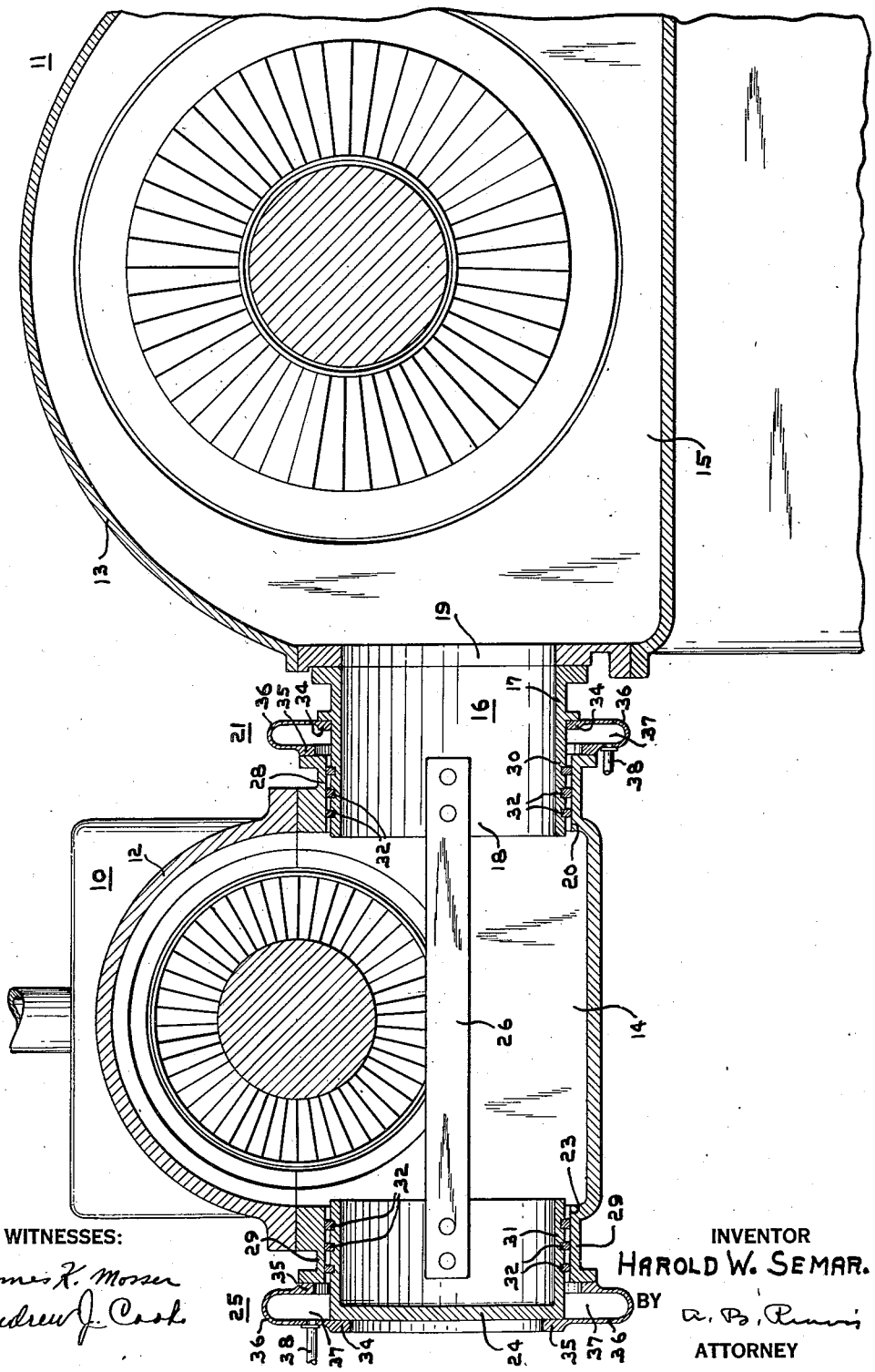
WITNESSES:
James K. Mosser
Andrew J. Cook
INVENTOR
HAROLD W. SEMAR.
BY
R. B. Rennis
ATTORNEY

UNITED STATES PATENT OFFICE 2,278,152

MARINE TURBINE CROSS-OVER CONNECTION

Harold W. Semar, Springfield, Pa., assignor to Westinghouse Electric & Manufacturing Company, East Pittsburgh, Pa., a corporation of Pennsylvania Application May 13, 1941, Serial No. 393,201

9 Claims. (Cl. 60—70)

The invention relates to a compound turbine arrangement and it has for an object to provide an improved cross-over conduit for connecting the high and low pressure units thereof.

A more particular object of the invention is to provide a cross-over connection joining the outlet of a high-pressure turbine to the inlet of a low-pressure turbine and having telescoping movement with respect to one of the turbines together with means for balancing the reaction of the steam thrust to which the turbines would be subjected and brought about because of the telescopic relation of the cross-over connection and the consequent inability of the latter to serve as a stress connection between the turbines.

A further object of the invention is to provide high and low pressure turbines with the exhaust opening of the high-pressure turbine connected to the inlet opening of the low-pressure turbine by means of an expansion joint and means for balancing the elastic fluid reaction or thrust existing because of the expansion joint connection and the consequent absence of any stress connection between the turbines, the balancing means being comprised by a member, presenting a pressure area to the exhaust chamber of the high-pressure turbine and equal to the exhaust opening area or steam thrust area, together with tie means for connecting the low-pressure cylinder to the member.

These and other objects are effected by the invention as will be apparent from the following description and claims taken in connection with the accompanying drawing forming a part of this application, in which:

The single figure is a transverse sectional view of high and low-pressure turbines joined by the improved cross-over connection.

Referring to the drawing more in detail, there are shown high and low-pressure turbines, at 10 and 11, preferably of the marine propulsion type, the turbines including casings or cylinders 12 and 13, respectively. The exhaust chamber 14 of the high-pressure turbine is connected to the inlet chamber end 15 of the low-pressure turbine by means of the improved cross-over connection, at 16.

To facilitate installation and to provide for relative expansion and contraction of the turbine cylinders, the cross-over connection should not only provide a fluid-tight passage connecting the chambers 14 and 15, but also it should accommodate for small relative movements of the turbine cylinders 12 and 13 in all directions. Accordingly, therefore, the cross-over connection is shown as being comprised by the tubular member 17 attached to one of the cylinders, for example, the low-pressure cylinder 13 and providing a passage 18 affording communication between the inlet opening 19 of the low-pressure turbine and the exhaust opening 20 of the high-pressure turbine. The tubular member 17 is connected to the other cylinder, for example, the high-pressure cylinder, by means of an expansion joint, at 21.

Because of the expansion joint, the high- and low-pressure cylinders have capability of small relative movements in all directions; and, as the cylinders are no longer rigidly connected together, it will be apparent that the exhaust pressure of the high pressure cylinder exerts an unbalanced lateral thrust on each of the cylinders, the magnitude of this thrust or force depending upon the area of the exhaust opening 20 and the exhaust pressure.

To counteract or balance the lateral steam thrust or force imposed on the turbine cylinders, the turbine cylinder, other than the one to which the tubular extension 17 is attached, is provided with an opening in opposed relation to its opening within which the extension 17 is telescopically disposed. For example, the high-pressure cylinder is shown as having an opening 23 in opposed relation to exhaust opening 20 and having an area equal to that of the latter. A closure member 24 cooperates with the opening 23 and it is connected to the high-pressure cylinder 12 by means of an expansion joint, at 25. A strut or tie member 26 joins the closure member to the low-pressure cylinder and the tubular member 17 attached thereto, the member 26 preferably being attached to the tubular member 17. Thus, it will be seen that, as the openings 20 and 23 are in opposed relation and of equal areas, the elastic fluid thrust or reaction acting laterally in opposite directions and tending to separate the turbine cylinders is balanced by the thrust imposed on the closure member.

Preferably, the high-pressure cylinder 12 has tubular extensions 28 and 29 provided with the exhaust opening 20 and the opening 23 in opposed relation to the latter. The tubular member 17 and the closure member 24 have portions 30 and 31 telescoping in the openings 20 and 23, respectively, and means, such as suitable packing or piston rings 32, are provided for sealing the annular clearances between the peripheral surfaces of the telescopic portions 30 and 31 and the walls encompassing the openings 20 and 23.

As shown, the expansion joints, at 21 and 25, are each preferably comprised by an annular member including radial portions 34 and 35 joined by the flexible or thin wall 36. The inner radial portions 34 and 35 are attached, respectively, to one of the members 17 or 24 and to one of the tubular extensions 28 or 29. The flexible wall elements 36 provide for small relative movements in all directions of the tubular member 17 with respect to the cylinder 12 and of the closure member 24 with respect to the latter. Thus, due to the expansion joint, at 21, the turbine cylinders may have a small amount of relative movement in all directions, whereby, not only is installation facilitated, but more particularly accommodation is afforded for relative movements in consequence of expansion and contraction of the cylinders. The capacity for relative movement of the closure member 24 with respect to the cylinder 12 assures that the latter may accommodate itself to a position parallel to the tubular member 17, whereby binding is avoided.

The annular members each comprised by the inner radial portions 34 and 35 joined by the flexible wall 36 cooperate with the tubular member 17 or with the closure member 24 and with the tubular expansions 28 or 29 to provide chambers 37, either or both of which are connected by conduits 38 to a suitable steam pressure region, for example, to a gland sealing steam system. Thus, the steam pressure region to which the conduit 38 is connected establishes the pressure existing in either chamber 37; and, if the pressure, so established, is less than the pressure in the exhaust chamber 14, then to the extent permitted by the packing 32, there will be leakage of steam from the chamber 14 to a chamber 37, the extent of leakage depending upon the difference in pressures in these chambers. On the other hand, if the arrangement is such that the pressure in a chamber 37 is higher than that in the exhaust chamber 14, then leakage will occur from the former to the latter.

While the high-pressure cylinder is specially described and illustrated as having opposed openings, the low-pressure cylinder as having an opening aligned with the opposed openings and provided with a tubular member bounding its opening and telescoping in one of the opposed openings, the closure member for the other of the opposed openings as being connected by the strut or link 26 to the low pressure cylinder, this is done to facilitate ready comprehension of the invention. The invention contemplates high and low-pressure cylinders regarded collectively as first and second cylinders, either cylinder of which may be assumed to be the "first" cylinder and the other the "second" cylinder. If the first cylinder is assumed to have the first and second opposed openings 20 and 23, then the second cylinder would have the third opening 19 bounded by the tubular member 17 telescoping in the first opening 20 and the strut 26 would connect the closure member 24 for the second opening to the second cylinder.

While the invention has been shown in but one form, it will be obvious to those skilled in the art that it is not so limited, but is susceptible of various changes and modifications without departing from the spirit thereof, and it is desired, therefore, that only such limitations shall be placed thereupon as are specifically set forth in the appended claims.

What is claimed is:

1. In combination, a high-pressure turbine, a low-pressure turbine, said turbines including first and second cylinders, the high-pressure turbine cylinder having an elastic fluid exhaust opening and the low-pressure turbine cylinder having an elastic fluid inlet opening, means including a member attached to the first cylinder and providing a passage connecting said openings and including an expansion joint connecting the member to the second cylinder, said member and said second cylinder constituting a unitary cylinder construction, said means defining a pressure area subject to elastic fluid exhaust pressure of the high-pressure turbine resulting in a force or reaction tending to move the turbines apart laterally, a member providing a pressure area in opposed relation to the first pressure area and equal to the latter, an expansion joint connecting said last-named member to the first cylinder, and tie means connecting the last-named member and said cylinder construction.

2. In combination, a high-pressure turbine, a low-pressure turbine; said turbines including first and second cylinders; the high-pressure cylinder having an elastic-fluid exhaust opening and the low-pressure cylinder having an elastic-fluid inlet opening; means including a member attached to the first cylinder and providing a passage connecting the openings; said member and the first cylinder constituting a cylinder construction; and the member having telescopic relation with respect to one of said openings; said second cylinder having a second opening in opposed relation to its said opening and equal in area to the latter; a closure member for the second opening; an expansion joint connecting the closure member to the second cylinder; and a tie member connecting said cylinder construction and the closure member.

3. In combination, a high-pressure turbine; a low-pressure turbine; said turbines including first and second cylinders; the first cylinder having a tubular extension providing a first opening and having a second opening in opposed relation with respect to the first opening and the second cylinder having a third opening; said first and third openings constituting exhaust and inlet openings for the cylinders; a tubular member attached to the second cylinder, providing a passage placing the first and third openings in communication, and having telescopic relation with respect to the first opening; said second cylinder and the tubular member constituting a cylinder construction; an expansion joint connecting said tubular member and the first cylinder; a closure member for the second opening; an expansion joint connecting the closure member and the first cylinder; and tie means connecting said cylinder construction and the closure member.

4. The combination as claimed in claim 3 wherein the first and second openings of the first cylinder are equal in area.

5. In combination, a high-pressure turbine; a low-pressure turbine; said turbines including first and second cylinders; the first cylinder having tubular extensions providing a first opening and having a second opening in opposed relation to the first opening and the second cylinder having a third opening aligned with the first and second openings; said first and second openings being equal in area; a tubular member attached to the second cylinder, providing a passage placing the first and third openings in communication, and telescoping in the first opening; an expansion joint connecting the tubular member and the first cylinder; a closure member telescoping in the second opening; an expansion joint connecting the closure member to the first cylinder; and tie means connecting said members.

6. The combination as claimed in claim 5 with packing means for sealing the annular clearance spaces between the telescopic portions of the tubular and closure members and the first and second openings.

7. In combination, a high-pressure turbine; a low-pressure turbine; said turbines including first and second cylinders; the first cylinder having tubular extensions providing first and second openings in opposed relation and the second cylinder having a third opening aligned with the first and second openings; said first and second openings being equal in area; a tubular member attached to the second cylinder, providing a passage placing the first and third openings in communication, and telescoping in the first opening; an expansion joint connecting the tubular member and the first cylinder; a closure member telescoping in the second opening; an expansion joint connecting the closure member and the first cylinder; each of said expansion joints including an annular member comprising inner radial portions attached to one of the tubular extensions and to one of the members and a wall portion joining the radial portions and flexible so as to provide for telescopic movement of the tubular and closure members with respect to the first and second openings, respectively; packing for sealing the annular clearance space between the bounding walls of the first and second openings and the peripheral surfaces of the telescopic portions of the tubular and closure members; and tie means connecting said tubular and closure members.

8. The combination as claimed in claim 7 wherein at least one of the annular members defines, with the associated tubular extension and telescopic member, an enclosed chamber, and a conduit providing for communication of the chamber with a region of suitable elastic fluid pressure.

9. The combination as claimed in claim 7 wherein said annular member is metallic.

HAROLD W. SEMAR.